US012365791B2

(12) United States Patent
Sung et al.

(10) Patent No.: US 12,365,791 B2
(45) Date of Patent: Jul. 22, 2025

(54) THERMOPLASTIC RESIN COMPOSITION AND EXTERIOR MATERIAL INCLUDING THE SAME

(71) Applicant: LG CHEM, LTD., Seoul (KR)

(72) Inventors: Daeun Sung, Daejeon (KR); Wangrae Joe, Daejeon (KR); Daewoong Lee, Daejeon (KR); Tae Hoon Kim, Daejeon (KR); Chun Ho Park, Daejeon (KR); Yong Hee An, Daejeon (KR); Jeongmin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 520 days.

(21) Appl. No.: 17/919,326

(22) PCT Filed: Jan. 27, 2022

(86) PCT No.: PCT/KR2022/001435
§ 371 (c)(1),
(2) Date: Oct. 17, 2022

(87) PCT Pub. No.: WO2022/186484
PCT Pub. Date: Sep. 9, 2022

(65) Prior Publication Data
US 2023/0174769 A1 Jun. 8, 2023

(30) Foreign Application Priority Data
Mar. 2, 2021 (KR) .................. 10-2021-0027130

(51) Int. Cl.
| C08L 51/00 | (2006.01) |
| C08L 25/12 | (2006.01) |
| C08L 51/04 | (2006.01) |
| C08L 77/00 | (2006.01) |
| C08L 77/06 | (2006.01) |

(52) U.S. Cl.
CPC ............. *C08L 51/003* (2013.01); *C08L 25/12* (2013.01); *C08L 51/04* (2013.01); *C08L 77/00* (2013.01); *C08L 77/06* (2013.01); *C08L 2205/025* (2013.01); *C08L 2205/03* (2013.01); *C08L 2205/035* (2013.01)

(58) Field of Classification Search
CPC .......... C08L 25/12; C08L 51/04; C08L 77/06; C08K 3/22
See application file for complete search history.

(56) References Cited

U.S. PATENT DOCUMENTS

| 5,837,772 | A | 11/1998 | McKee et al. |
| 5,981,628 | A | 11/1999 | Takamoto et al. |
| 6,696,165 | B1 | 2/2004 | Bennett et al. |
| 2004/0097648 | A1 | 5/2004 | Nakai et al. |
| 2017/0369692 | A1 | 12/2017 | Park et al. |
| 2019/0382574 | A1* | 12/2019 | An .......... C08L 33/062 |
| 2020/0283614 | A1* | 9/2020 | Kim .......... C08L 51/003 |
| 2021/0047481 | A1 | 2/2021 | Uchida et al. |
| 2022/0363888 | A1 | 11/2022 | Joe et al. |

FOREIGN PATENT DOCUMENTS

| CN | 107109023 A | 8/2017 |
| CN | 109071912 A | 12/2018 |
| EP | 4011966 A1 | 6/2022 |
| JP | H08-311353 A | 11/1996 |
| JP | 2002-194034 A | 7/2002 |
| KR | 10-1998-0071779 A | 10/1998 |
| KR | 10-0364228 B1 | 2/2003 |
| KR | 10-0361161 B1 | 4/2003 |
| KR | 10-2007-0092884 A | 9/2007 |
| KR | 10-0778012 B1 | 11/2007 |
| KR | 10-2013-0075793 A | 7/2013 |
| KR | 10-2015-0069888 A | 6/2015 |
| KR | 10-2016-0057601 A | 5/2016 |
| KR | 10-2018-0075743 A | 7/2018 |
| KR | 10-2019-0065944 A | 6/2019 |
| WO | 2019208653 A1 | 10/2019 |

OTHER PUBLICATIONS

First Office Action dated Jan. 8, 2024 from the CNIPA corresponding Chinese Patent Application No. 202280003443.9.
International Search Report and Written Opinion issued in corresponding International Patent Application No. PCT/KR2022/001435, dated May 9, 2022.
Office Action issued Sep. 25, 2023 for counterpart Japanese Patent Application No. 2022-559722.
Extended Search Report issued Sep. 28, 2023 for counterpart European Patent Application No. 22763469.8.

* cited by examiner

*Primary Examiner* — Eli D. Strah
(74) *Attorney, Agent, or Firm* — Morgan, Lewis & Bockius LLP

(57) ABSTRACT

The present disclosure relates to a thermoplastic resin composition and an exterior material including the same. The thermoplastic resin composition has low gloss and has mechanical properties and processability equal or superior to those of conventional ASA resins. The thermoplastic resin composition also has improved viscoelastic properties that can lead to excellent processability during the manufacture of a co-extruded product and excellent adhesion within the co-extruded product. The thermoplastic resin composition is also capable of reducing surface defects.

12 Claims, No Drawings

THERMOPLASTIC RESIN COMPOSITION AND EXTERIOR MATERIAL INCLUDING THE SAME

CROSS-REFERENCE TO RELATED APPLICATION

This application claims priority to Korean Patent Application No. 10-2021-0027130, filed on Mar. 2, 2021 in the Korean Intellectual Property Office, the disclosure of which is incorporated herein by reference.

TECHNICAL FIELD

The present invention relates to a thermoplastic resin composition and an exterior material including the same. More particularly, the present invention relates to a low-gloss thermoplastic resin composition having excellent aesthetics, such as softness, luxuriousness, and naturalness due to improvement in surface texture while maintaining mechanical properties and processability equal or superior to those of conventional ASA-based resins and having excellent processability and adhesion in manufacture of a co-extruded product due to improvement in viscoelastic properties; and an exterior material including the low-gloss thermoplastic resin composition. Accordingly, when the resin composition of the present invention is used, defects in surface appearance may be significantly reduced.

BACKGROUND ART

Acrylate compound-styrene-acrylonitrile copolymers (hereinafter referred to as "ASA resins") have weather resistance, aging resistance, chemical resistance, rigidity, impact resistance, and processability, and have been widely used in various fields such as automobiles, miscellaneous goods, and construction materials.

In the case of ASA resins used in exterior materials, there is increasing need for development of a low-gloss ASA resin that can satisfy aesthetic demands without the artificial feeling of plastics.

Conventionally, crystalline resins such as nylon have been used as low-gloss ASA resins. However, a difference in viscoelasticity occurs during co-extrusion of the crystalline resin with PVC to manufacture an exterior material, resulting in defects in appearance compared to single-layer extrusion.

In the case of a conventional ASA resin, extrusion and injection are generally performed at a processing temperature of 200 to 240° C. On the other hand, in the case of a PVC resin, since the PVC resin is easily carbonized at a high temperature of 200° C. or higher, co-extrusion of the PVC resin must be performed at a low temperature of less than 200° C. However, since the viscosity of an ASA resin rapidly increases at a low temperature of less than 200° C., during co-extrusion with the PVC resin, a PVC resin layer is not properly covered with an ASA resin layer, resulting in surface defects such as flow marks and peeling of the ASA resin.

RELATED ART DOCUMENTS

Patent Documents

KR 2019-0065944 A

DISCLOSURE

Technical Problem

Therefore, the present invention has been made in view of the above problems, and it is one object of the present invention to provide a low-gloss thermoplastic resin composition that has excellent aesthetics, such as softness, luxuriousness, and naturalness due to improvement in surface texture while maintaining mechanical properties and processability equal or superior to those of conventional ASA resins, has excellent processability and adhesion in manufacture of a co-extruded product due to improvement in viscoelastic properties, and is capable of greatly reducing defects in surface appearance.

It is another object of the present invention to provide a molded article manufactured using the thermoplastic resin composition.

The above and other objects can be accomplished by the present invention described below.

Technical Solution

In accordance with one aspect of the present invention, provided is a thermoplastic resin composition including 10 to 50% by weight in total of an acrylate-aromatic vinyl compound-vinyl cyanide compound graft copolymer (A-1) containing acrylate rubber having a DLS average particle diameter of 0.05 to 0.2 μm or a TEM average particle diameter of 0.04 to 0.14 μm and an acrylate-aromatic vinyl compound-vinyl cyanide compound graft copolymer (A-2) containing acrylate rubber having a DLS average particle diameter of 0.33 to 0.5 μm or a TEM average particle diameter of 0.28 to 0.45 μm;

0 to 30% by weight of an aromatic vinyl compound-vinyl cyanide compound copolymer (B-1) having a weight average molecular weight of 100,000 to 160,000 g/mol;

20 to 70% by weight of an aromatic vinyl compound-vinyl cyanide compound copolymer (B-2) having a weight average molecular weight of greater than 160,000 and less than or equal to 200,000 g/mol; and 0.5 to 10% by weight of a polyamide resin (C) having a melting temperature (Tm) of 250° C. or higher, wherein an amount of the graft copolymer (A-1) is less than that of the graft copolymer (A-2).

The thermoplastic resin composition may have a melt shear viscosity of 310 Pa·s or less at a shear rate of 2,000 (1/sec) as measured at a measurement temperature of 190° C. and a shear rate of 10 to 2,000 (1/sec) using a capillary viscometer.

The thermoplastic resin composition may have a storage modulus (G') of 170,000 Pa or more at a frequency of 40 (rad/sec) as measured at a measurement temperature of 190° C., a strain of 0.1%, and a frequency of 0.1 to 500 (rad/sec) using a rotary rheometer.

Based on a total weight of the graft copolymers (A-1) and (A-2), the graft copolymer (A-1) may be included in an amount of 10 to 50% by weight and the graft copolymer (A-2) may be included in an amount of 50 to 90% by weight.

The acrylate-aromatic vinyl compound-vinyl cyanide compound graft copolymer (A-1) may include 40 to 60% by weight of acrylate rubber having a DLS average particle diameter of 0.05 to 0.2 μm or a TEM average particle diameter of 0.04 to 0.14 μm, 25 to 45% by weight of an aromatic vinyl compound, and 10 to 20% by weight of a vinyl cyanide compound, and the acrylate-aromatic vinyl compound-vinyl cyanide compound graft copolymer (A-2)

may include 40 to 60% by weight of acrylate rubber having a DLS average particle diameter of 0.33 to 0.5 µm or a TEM average particle diameter of 0.28 to 0.45 µm, 25 to 45% by weight of an aromatic vinyl compound, and 10 to 20% by weight of a vinyl cyanide compound.

The aromatic vinyl compound-vinyl cyanide compound copolymer (B-1) may include 65 to 80% by weight of an aromatic vinyl compound and 20 to 35% by weight of a vinyl cyanide compound, and the aromatic vinyl compound-vinyl cyanide compound copolymer (B-2) may include 65 to 80% by weight of an aromatic vinyl compound and 20 to 35% by weight of a vinyl cyanide compound.

Based on a total weight of the thermoplastic resin composition, the acrylate-aromatic vinyl compound-vinyl cyanide compound graft copolymer (A-1) may be included in an amount of 9 to 35% by weight, and the acrylate-aromatic vinyl compound-vinyl cyanide compound graft copolymer (A-2) may be included in an amount of 16 to 41% by weight.

The thermoplastic resin composition may include 0 to 30% by weight of an aromatic vinyl compound-vinyl cyanide compound copolymer (B-1) having a weight average molecular weight of 100,000 to 160,000 g/mol.

Based on 100 parts by weight in total of the thermoplastic resin composition, the thermoplastic resin composition may include 0.1 to 5 parts by weight of an inorganic pigment.

The thermoplastic resin composition may have a heat deflection temperature of 89° C. or lower as measured under a load of 18.5 kg/cm$^2$ according to ASTM D648.

Based on a total weight of the thermoplastic resin composition, the aromatic vinyl compound-vinyl cyanide compound copolymer (B-1) may be included in an amount of 10 to 30% by weight, and the aromatic vinyl compound-vinyl cyanide compound copolymer (B-2) may be included in an amount of 30 to 60% by weight.

In accordance with another aspect of the present invention, provided is a thermoplastic resin composition including:

34 to 36% by weight in total of an acrylate-aromatic vinyl compound-vinyl cyanide compound graft copolymer (A-1) containing acrylate rubber having a DLS average particle diameter of 0.05 to 0.2 µm or a TEM average particle diameter of 0.04 to 0.14 µm and an acrylate-aromatic vinyl compound-vinyl cyanide compound graft copolymer (A-2) containing acrylate rubber having a DLS average particle diameter of 0.33 to 0.5 µm or a TEM average particle diameter of 0.28 to 0.45 µm;

0 to 20% by weight of an aromatic vinyl compound-vinyl cyanide compound copolymer (B-1) having a weight average molecular weight of 100,000 to 160,000 g/mol;

38 to 58% by weight of an aromatic vinyl compound-vinyl cyanide compound copolymer (B-2) having a weight average molecular weight of greater than 160,000 and less than or equal to 200,000 g/mol; and 4 to 8% by weight of a polyamide resin (C) having a melting temperature (Tm) of 250° C. or higher, wherein the amount of the graft copolymer (A-1) is less than that of the graft copolymer (A-2);

the acrylate-aromatic vinyl compound-vinyl cyanide compound graft copolymer (A-1) includes 40 to 60% by weight of acrylate rubber having a DLS average particle diameter of 0.05 to 0.2 µm or a TEM average particle diameter of 0.04 to 0.14 µm, 25 to 45% by weight of an aromatic vinyl compound, and 10 to 20% by weight of a vinyl cyanide compound; the acrylate-aromatic vinyl compound-vinyl cyanide compound graft copolymer (A-2) includes 40 to 60% by weight of acrylate rubber having a DLS average particle diameter of 0.33 to 0.5 µm or a TEM average particle diameter of 0.28 to 0.45 µm, 25 to 45% by weight of an aromatic vinyl compound, and 10 to 20% by weight of a vinyl cyanide compound;

the aromatic vinyl compound-vinyl cyanide compound copolymer (B-1) includes 65 to 80% by weight of an aromatic vinyl compound and 20 to 35% by weight of a vinyl cyanide compound; and the aromatic vinyl compound-vinyl cyanide compound copolymer (B-2) includes 65 to 80% by weight of an aromatic vinyl compound and 20 to 35% by weight of a vinyl cyanide compound.

In accordance with yet another aspect of the present invention, provided is an exterior material including the above-described thermoplastic resin composition.

The exterior material may be a siding material, a roofing material, or a decking material.

Advantageous effects

According to the present invention, the present invention has an effect of providing a low-gloss thermoplastic resin composition that has excellent aesthetics, such as softness, luxuriousness, and naturalness due to uniform and low gloss and improvement in surface texture while having mechanical properties and processability equal or superior to those of conventional ASA resins, has excellent processability and adhesion in manufacture of a co-extruded product due to improvement in viscoelastic properties, and can greatly reduce defects in surface appearance and an exterior material including the low-gloss thermoplastic resin composition.

Accordingly, the thermoplastic resin composition and the molded article according to the present invention can be used to manufacture a siding material, a roofing material, or a decking material.

BEST MODE

Hereinafter, a thermoplastic resin composition and an exterior material including the same according to the present invention will be described in detail.

The present inventors confirmed that, when a polyamide having a specific melting temperature (Tm) is added in a predetermined amount to a predetermined styrene-based resin combination, compared to a conventional ASA resin composition, viscoelastic properties were improved and the surface appearance of a co-extruded product was improved without deterioration in mechanical properties, weather resistance, and processability. Based on these results, the present inventors conducted further studies to complete the present invention.

The thermoplastic resin composition of the present invention includes 10 to 50% by weight in total of an acrylate-aromatic vinyl compound-vinyl cyanide compound graft copolymer (A-1) containing acrylate rubber having a DLS average particle diameter of 0.05 to 0.2 µm or a TEM average particle diameter of 0.04 to 0.14 µm and an acrylate-aromatic vinyl compound-vinyl cyanide compound graft copolymer (A-2) containing acrylate rubber having a DLS average particle diameter of 0.33 to 0.5 µm or a TEM average particle diameter of 0.28 to 0.45 µm; 0 to 30% by weight of an aromatic vinyl compound-vinyl cyanide compound copolymer (B-1) having a weight average molecular weight of 100,000 to 160,000 g/mol; 20 to 70% by weight of an aromatic vinyl compound-vinyl cyanide compound copolymer (B-2) having a weight average molecular weight of greater than 160,000 and less than or equal to 200,000 g/mol; and 0.5 to 10% by weight of a polyamide resin (C) having a melting temperature (Tm) of 250° C. or higher, wherein the amount of the graft copolymer (A-1) is less than that of the graft copolymer (A-2). In this case, the present invention has an effect of providing a thermoplastic resin composition that has excellent weather resistance and low gloss while maintaining mechanical properties and processability equal or superior to those of conventional ASA-based resins, has excellent processability and adhesion in manufacture of a co-extruded product due to improvement in viscoelastic properties, and is capable of greatly reducing defects in surface appearance.

In addition, the thermoplastic resin composition of the present invention includes 34 to 36% by weight in total of an acrylate-aromatic vinyl compound-vinyl cyanide compound graft copolymer (A-1) containing acrylate rubber having a DLS average particle diameter of 0.05 to 0.2 μm or a TEM average particle diameter of 0.04 to 0.14 μm and an acrylate-aromatic vinyl compound-vinyl cyanide compound graft copolymer (A-2) containing acrylate rubber having a DLS average particle diameter of 0.33 to 0.5 μm or a TEM average particle diameter of 0.28 to 0.45 μm; 10 to 30% by weight of an aromatic vinyl compound-vinyl cyanide compound copolymer (B-1) having a weight average molecular weight of 100,000 to 160,000 g/mol; 38 to 58% by weight of an aromatic vinyl compound-vinyl cyanide compound copolymer (B-2) having a weight average molecular weight of greater than 160,000 and less than or equal to 200,000 g/mol; and 4 to 8% by weight of a polyamide resin (C) having a melting temperature (Tm) of 250° C. or higher, wherein the amount of the graft copolymer (A-1) is less than that of the graft copolymer (A-2), the acrylate-aromatic vinyl compound-vinyl cyanide compound graft copolymer (A-1) includes 40 to 60% by weight of acrylate rubber having a DLS average particle diameter of 0.05 to 0.2 μm or a TEM average particle diameter of 0.04 to 0.14 μm, 25 to 45% by weight of an aromatic vinyl compound, and 10 to 20% by weight of a vinyl cyanide compound, the acrylate-aromatic vinyl compound-vinyl cyanide compound graft copolymer (A-2) includes 40 to 60% by weight of acrylate rubber having a DLS average particle diameter of 0.33 to 0.5 μm or a TEM average particle diameter of 0.28 to 0.45 μm, 25 to 45% by weight of an aromatic vinyl compound, and 10 to 20% by weight of a vinyl cyanide compound, the aromatic vinyl compound-vinyl cyanide compound copolymer (B-1) includes 65 to 80% by weight of an aromatic vinyl compound and 20 to 35% by weight of a vinyl cyanide compound, and the aromatic vinyl compound-vinyl cyanide compound copolymer (B-2) includes 65 to 80% by weight of an aromatic vinyl compound and 20 to 35% by weight of a vinyl cyanide compound. In this case, the present invention has an effect of providing a thermoplastic resin composition that has excellent weather resistance and low gloss while maintaining mechanical properties and processability equal or superior to those of conventional ASA-based resins, has excellent processability and adhesion in manufacture of a co-extruded product due to improvement in viscoelastic properties, and is capable of greatly reducing defects in surface appearance.

Hereinafter, each component constituting the thermoplastic resin composition of the present invention will be described in detail.

Acrylate-Aromatic Vinyl Compound-Vinyl Cyanide Compound Graft Copolymer (A-1) Containing Acrylate Rubber Having a DLS Average Particle Diameter of 0.05 to 0.2 μm or a TEM Average Particle Diameter of 0.04 to 0.14 μm The acrylate rubber of the graft copolymer (A-1) preferably has a DLS average particle diameter of 0.04 to 0.18 μm, more preferably 0.05 to 0.2 μm, still more preferably 0.08 to 0.14 μm, still more preferably 0.08 to 0.12 μm. Within this range, excellent weather resistance, colorability, impact strength, chemical resistance, and surface gloss may be imparted to a final product.

In the present disclosure, the DSL average particle diameter may be measured by dynamic light scattering, and specifically, may be measured as an intensity value using a Nicomp 380 particle size analyzer (manufacturer: PSS) in a Gaussian mode. As a specific measurement example, a sample may be prepared by diluting 0.1 g of latex (TSC: 35 to 50 wt %) 1,000 to 5,000 times with distilled water, and DSL average particle diameter may be measured using flow cells in an auto-dilution manner and in a mode of dynamic light scattering/intensity 300 kHz/intensity-weight Gaussian analysis. At this time, temperature may be set to 23° C., measurement wavelength may be set to 632.8 nm, and channel width may be set to 10 μsec.

In addition, in the present disclosure, the DLS average particle diameter may be an arithmetic average particle diameter in a particle size distribution measured by dynamic light scattering, specifically, a scattering intensity average particle diameter.

In the present disclosure, the TEM average particle diameter may be measured by transmission electron microscope (TEM) analysis. Specifically, the TEM average particle diameter refers to a value obtained by numerically measuring particle size on a high magnification image of a TEM and averaging the measurement results. In this case, a specific measurement example is as follows:

Sample preparation: A thermoplastic resin or a thermoplastic resin composition is prepared using an extrusion kneader.

Sample pretreatment: Trimming (23° C.)→hydrazine treatment (72° C., 5 days)→sectioning (−120° C.)→$OsO_4$ vapor staining for 2 hours Analyzer: TEM (JEM-1400, Jeol Co.)

Analysis conditions: Acc. Volt: 120 kV, spot size: 1 (×10K, ×25K, ×50K)

Size (average particle diameter) measurement: An average diameter of particles in the top 10% of a particle diameter distribution is measured.

For example, based on a total weight of the graft copolymers (A-1) and (A-2), the graft copolymer (A-1) is included in an amount of 10 to 50% by weight, preferably 20 to 50% by weight, more preferably 30 to 50% by weight. Within this range, weather resistance, fluidity, tensile strength, and impact strength may be excellent.

For example, the graft copolymer (A-1) may include 40 to 60% by weight of the acrylate rubber, 25 to 45% by weight of an aromatic vinyl compound, and 10 to 20% by weight of a vinyl cyanide compound, preferably 40 to 60% by weight of the acrylate rubber, 25 to 40% by weight of an aromatic vinyl compound, and 10 to 20% by weight of a vinyl cyanide compound, more preferably 47 to 57% by weight of the acrylate rubber, 30 to 40% by weight of an aromatic vinyl compound, and 10 to 20% by weight of a vinyl cyanide compound. Within this range, weather resistance, fluidity, tensile strength, and impact strength may be excellent.

In the present disclosure, a polymer including a compound refers to a polymer prepared by polymerizing the compound, and a unit in the polymerized polymer is derived from the compound.

In the present disclosure, for example, the acrylate may include one or more selected from the group consisting of alkyl acrylates containing an alkyl group having 2 to 8 carbon atoms, and is preferably an alkyl acrylate containing an alkyl group having 4 to 8 carbon atoms, more preferably butyl acrylate or ethylhexyl acrylate.

In the present disclosure, for example, the aromatic vinyl compound may include one or more selected from the group consisting of styrene, a-methylstyrene, m-methylstyrene, p-methylstyrene, and p-tert-butylstyrene, and is preferably styrene.

In the present disclosure, for example, the vinyl cyanide compound may include one or more selected from the group consisting of acrylonitrile, methacrylonitrile, ethylacrylonitrile, and isopropylacrylonitrile, and is preferably acrylonitrile.

For example, the graft copolymer (A-1) may be prepared by emulsion polymerization. In this case, chemical resistance, weather resistance, fluidity, tensile strength, and impact strength may be excellent.

Emulsion polymerization commonly practiced in the art to which the present invention pertains may be used in the present invention without particular limitation.

Acrylate-Aromatic Vinyl Compound-Vinyl Cyanide Compound Graft Copolymer (A-2) Containing Acrylate Rubber Having a DLS Average Particle Diameter of 0.33 to 0.5 μm or a TEM Average Particle Diameter of 0.28 to 0.45 μm The acrylate rubber of the graft copolymer (A-2) preferably has a DLS average particle diameter of 0.33 to 0.5 μm, more preferably 0.38 to 0.5 μm, still more preferably 0.4 to 0.5 μm. Within this range, weather resistance may be good, and mechanical properties such as fluidity, tensile strength, and impact strength may be excellent.

For example, based on a total weight of the graft copolymers (A-1) and (A-2), the graft copolymer (A-2) may be included in an amount of 50 to 90% by weight, preferably 50 to 80% by weight, more preferably 50 to 70% by weight. Within this range, weather resistance, fluidity, tensile strength, and impact strength may be excellent.

For example, the graft copolymer (A-2) may include 40 to 60% by weight of the acrylate rubber, 25 to 45% by weight of an aromatic vinyl compound, and 10 to 20% by weight of a vinyl cyanide compound, preferably 45 to 55% by weight of the acrylate rubber, 30 to 40% by weight of an aromatic vinyl compound, and 10 to 20% by weight of a vinyl cyanide compound. Within this range, weather resistance, fluidity, tensile strength, and impact strength may be excellent.

For example, the graft copolymer (A-2) may be prepared by emulsion polymerization. In this case, weather resistance, fluidity, tensile strength, and impact strength may be excellent.

Emulsion polymerization commonly practiced in the art to which the present invention pertains may be used in the present invention without particular limitation.

Mixing of Graft Copolymer (A-1) and Graft Copolymer (A-2)

When mixing the acrylate-aromatic vinyl compound-vinyl cyanide compound graft copolymer (A-1) containing acrylate rubber having a DLS average particle diameter of 0.05 to 0.2 μm or a TEM average particle diameter of 0.04 to 0.14 μm and the acrylate-aromatic vinyl compound-vinyl cyanide compound graft copolymer (A-2) containing acrylate rubber having a DLS average particle diameter of 0.33 to 0.5 μm or a TEM average particle diameter of 0.28 to 0.45 μm, due to improvement in viscoelastic properties, surface appearance of a co-extruded product may be improved while maintaining mechanical properties and processability equal or superior to those of a conventional ASA resin, thereby increasing the quality and reliability of the product.

A weight ratio (A-1:A-2) of the acrylate-aromatic vinyl compound-vinyl cyanide compound graft copolymer (A-1) to the acrylate-aromatic vinyl compound-vinyl cyanide compound graft copolymer (A-2) is preferably 1:0.5 to 3, more preferably 1:1 to 3, as a preferred example, 1:1.1 to 2.9, as a more preferred example, 1:1.11 to 2.8, as another preferred example, 1:1.11 to 2.7, as a still more preferred example, 1:1.1 to 2.6. Within this range, due to appropriate melt shear viscosity and storage modulus, processing may be performed easily.

Two Types of Aromatic Vinyl Compound-Vinyl Cyanide Compound Copolymers (B) Having Different Weight Average Molecular Weights In the present disclosure, for example, in two types of aromatic vinyl compound-vinyl cyanide compound copolymers (B) having different weight average molecular weights, the aromatic vinyl compound-vinyl cyanide compound copolymers preferably include one or more selected from the group consisting of an aromatic vinyl compound-vinyl cyanide compound copolymer (B-1) having a weight average molecular weight of 100,000 to 160,000 g/mol and an aromatic vinyl compound-vinyl cyanide compound copolymer (B-2) having a weight average molecular weight of greater than 160,000 g/mol and less than or equal to 200,000 g/mol, more preferably a mixture of the aromatic vinyl compound-vinyl cyanide compound copolymer (B-1) and the aromatic vinyl compound-vinyl cyanide compound copolymer (B-2). In this case, since two types of aromatic vinyl compound-vinyl cyanide compound copolymers having different weight average molecular weights are used, heat resistance, chemical resistance, impact strength, tensile strength, and processability may be excellent.

Based on a total weight of the thermoplastic resin composition, the aromatic vinyl compound-vinyl cyanide compound copolymer (B-2) is preferably included in an amount of 30 to 70% by weight, more preferably 30 to 60% by weight, still more preferably 35 to 60% by weight. In this case, heat resistance, chemical resistance, impact strength, tensile strength, and processability may be excellent.

Based on a total weight of the thermoplastic resin composition, the aromatic vinyl compound-vinyl cyanide compound copolymer (B-1) is preferably included in an amount of 0 to 30% by weight, more preferably 0 to 25% by weight, still more preferably 0 to 20% by weight, as a preferred example, 1 to 30% by weight, as a more preferred example, 10 to 25% by weight, as a still more preferred example, 15 to 20% by weight. In this case, heat resistance, chemical resistance, impact strength, tensile strength, and processability may be excellent.

In the present disclosure, unless defined otherwise, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+1×PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the aromatic vinyl compound-vinyl cyanide compound copolymers (B-1) and (B-2) each include 65 to 80% by weight of an aromatic vinyl compound and 20 to 35% by weight of a vinyl cyanide compound, preferably 67 to 80% by weight of an aromatic vinyl compound and 20 to 33% by weight of a vinyl cyanide compound, more preferably 70 to 75% by weight of an aromatic vinyl compound and 25 to 30% by weight of a vinyl cyanide compound. Within this range, chemical resistance, impact strength, tensile strength, and processability may be excellent.

For example, the aromatic vinyl polymers (B-1) and (B-2) may be prepared by suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

In the present disclosure, to improve viscoelastic properties, the above-described aromatic vinyl compound-vinyl cyanide compound copolymers (B-1) and (B-2) are preferably used, and the use of a heat-resistant styrene-based resin or a methacrylate-aromatic vinyl compound-vinyl cyanide compound copolymer is preferably excluded.

Mixing of Graft Copolymer (A-1), Graft Copolymer (A-2), and Two Types of Aromatic Vinyl Compound-Vinyl Cyanide Compound Copolymers (B) Having Different Weight Average Molecular Weights The thermoplastic resin composition preferably includes 10 to 50% by weight in total of the graft copolymer (A-1) and the graft copolymer (A-2) and 50 to 90% by weight of two types of aromatic vinyl compound-vinyl cyanide compound copolymers (B) having different weight average molecular weights, more preferably 20 to 50% by weight in total of the graft copolymer (A-1) and the graft copolymer (A-2) and 50 to 80% by weight of two types of aromatic vinyl compound-vinyl cyanide compound copolymers (B) having different weight average molecular weights, still more preferably 30 to 50% by weight in total of the graft copolymer (A-1) and the graft copolymer (A-2) and 50 to 70% by weight of two types of aromatic vinyl compound-vinyl cyanide compound copolymers (B) having different weight average molecular weights, still more preferably 30 to 45% by weight in total of the graft copolymer (A-1) and the graft copolymer (A-2) and 55 to 70% by weight of two types of aromatic vinyl compound-vinyl cyanide compound copolymers (B) having different weight average molecular weights, most preferably 30 to 50% by weight in total of the graft copolymer (A-1) and the graft copolymer (A-2) and 50 to 70% by weight of two types of aromatic vinyl compound-vinyl cyanide compound copolymers (B) having different weight average molecular weights. Within this range, excellent weather resistance and low gloss may be achieved without deterioration in mechanical properties and processability, and due to improvement in viscoelastic properties, the surface appearance of a co-extruded product may be improved.

Polyamide

Based on the thermoplastic resin composition ((A-1) to C)), the polyamide resin of the present invention is preferably included in an amount of 0.5 to 10% by weight, more preferably 1 to 10% by weight, still more preferably 3 to 8% by weight, most preferably 5 to 7% by weight. Within this range, the present invention has an effect of providing a thermoplastic resin composition having excellent weather resistance and low gloss while maintaining mechanical properties and processability at a certain level. In addition, due to improvement in viscoelastic properties, the surface appearance of a product may be improved.

The polyamide resin preferably has a melting temperature (Tm) of 250° C. or more, as a specific example, 250 to 280° C., as a preferred example, 250 to 270° C. Within this range, due to low gloss, uniform surface gloss, and a low surface roughness value, an aesthetically pleasing effect and a soft feeling may be realized.

In the present disclosure, melting temperature (Tm) may be measured using measurement methods commonly used in the art to which the present invention pertains. As a specific example, melting temperature (Tm) may be measured using a dynamic scanning calorimeter (DSC).

The polyamide resin preferably has a relative viscosity (96% sulfuric acid solution) of 2.8 or less, as a preferred example, 2.0 to 2.8, as a preferred example, 2.2 to 2.5. Within this range, weather resistance may be excellent while maintaining mechanical properties and processability. In addition, due to low gloss, uniform surface gloss, and a low surface roughness value, a thermoplastic resin composition capable of providing an aesthetically pleasing effect and a soft feeling may be provided.

In the present disclosure, unless defined otherwise, "%" means "% by weight".

In the present disclosure, when the polyamide resin satisfies the melting temperature according to the present invention, the types thereof are not particularly limited. As a specific example, the polyamide resin may include one or more selected from the group consisting of polyamide 6, polyamide 66 (PA 6.6), polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I, preferably one or more selected from the group consisting of polyamide 6, polyamide 12, and polyamide 66.

Polymerization methods commonly practiced in the art to which the present invention pertains may be used to prepare the polyamide resin. In addition, commercially available polyamides may be used when the polyamides conform to the definition of the polyamide according to the present invention.

Thermoplastic Resin Composition

For example, based on 100 parts by weight in total of the thermoplastic resin composition, the thermoplastic resin composition of the present invention may include an inorganic pigment in an amount of 0.1 to 5 parts by weight, preferably 0.1 to 2 parts by weight, more preferably 0.1 to 1 part by weight, still more preferably 0.3 to 0.6 parts by weight. Within this range, weather resistance and hiding power may be excellent.

For example, the inorganic pigment may include one or more selected from the group consisting of metal compounds including Ti, Pb, Fe, and Cr and carbon black. The metal compounds are preferably metal oxides or metal hydroxides. As a specific example, the inorganic pigment may include one or more selected from the group consisting of TiO$_2$ and zinc oxide as white inorganic pigments; carbon black and graphite as black inorganic pigments; IOR, cadmium red, and red lead (Pb$_3$O$_4$) as red inorganic pigments; chrome yellow, zinc chromate, and cadmium yellow as yellow inorganic pigments; and chrome green and zinc green as green inorganic pigments, and most preferably, is TiO$_2$, which is a white inorganic pigment.

The thermoplastic resin composition may have a heat deflection temperature (HDT) of 83° C. or higher, more preferably 83.6° C. or higher, as a preferred example, 83 to 86° C. as measured under a load of 18.5 kg/cm$^2$ according to ASTM D648. Within this range, heat resistance and co-extrusion properties may be excellent.

For example, the thermoplastic resin composition may have a melt index (MI) (220° C., load: 10 kg) of 4 g/10 min or more, preferably 5 to 10 g/10 min, as a preferred example, 5 to 8 g/10 min, as a more preferred example, 5 to 7.5 g/10 min as measured according to ASTM D1238. Within this range, processability and the surface appearance of a co-extrusion may be excellent.

For example, the thermoplastic resin composition may have a tensile strength (1/8 inch) of 460 kg/cm$^2$ or more, preferably 460 to 510 kg/cm$^2$, as a preferred example, 480 to 510 kg/cm$^2$ as measured according to ASTM D638. Within this range, the thermoplastic resin composition may be suitable for siding materials, roofing materials, and decking materials.

For example, the thermoplastic resin composition may have an Izod impact strength (¼ inch) of 6 kg·cm/cm or more, preferably 6 to 10 kg·cm/cm, as a preferred example, 6 to 8 kg·cm/cm as measured according to ASTM D256. Within this range, the thermoplastic resin composition may be suitable for siding materials, roofing materials, and decking materials.

At a shear rate of 2,000 (1/sec), the thermoplastic resin composition may have a melt shear viscosity of 310 Pa·s or less, preferably 297 Pa·s or less, as a preferred example, 268 to 297 Pa·s as measured at a measurement temperature of 190° C. and a shear rate of 10 to 2,000 (1/sec) using a capillary viscometer. Within this range, the thermoplastic resin composition may be suitable for siding materials, roofing materials, and decking materials.

At a frequency of 40 (rad/sec), the thermoplastic resin composition may have a storage modulus (G') of 170,000 Pa or more, preferably 170,500 Pa or more, as a preferred example, 175,000 to 195,300 Pa as measured at a measurement temperature of 190° C., a strain of 0.1%, and a frequency of 0.1 to 500 (rad/sec) using a rotary rheometer. Within this range, the thermoplastic resin composition may be suitable for siding materials, roofing materials, and decking materials.

When necessary, based on 100 parts by weight in total of the thermoplastic resin compositions (A-1) to (C), the thermoplastic resin composition may further include 0.01 to 5 parts by weight, 0.05 to 3 parts by weight, 0.1 to 2 parts by weight or 0.5 to 1 part by weight of one or more selected from the group consisting of a lubricant, a pigment, a heat stabilizer, a light stabilizer, a dye, a colorant, a release agent, an antistatic agent, an antibacterial agent, a processing aid, a metal deactivator, a flame retardant, a smoke suppressant, an anti-drip agent, an anti-friction agent, and an anti-wear agent. Within this range, the required physical properties of the thermoplastic resin composition of the present invention may be implemented without deterioration in the intrinsic physical properties thereof.

A method of preparing the thermoplastic resin composition of the present invention preferably includes a step of mixing 10 to 50% by weight in total of an acrylate-aromatic vinyl compound-vinyl cyanide compound graft copolymer (A-1) containing acrylate rubber having a DLS average particle diameter of 0.05 to 0.2 μm or a TEM average particle diameter of 0.04 to 0.14 μm and an acrylate-aromatic vinyl compound-vinyl cyanide compound graft copolymer (A-2) containing acrylate rubber having a DLS average particle diameter of 0.33 to 0.5 μm or a TEM average particle diameter of 0.28 to 0.45 μm; 0 to 30% by weight of an aromatic vinyl compound-vinyl cyanide compound copolymer (B-1) having a weight average molecular weight of 100,000 to 160,000 g/mol; 20 to 70% by weight of an aromatic vinyl compound-vinyl cyanide compound copolymer (B-2) having a weight average molecular weight of greater than 160,000 and less than or equal to 200,000 g/mol; and 0.5 to 10% by weight of a polyamide resin (C) having a melting temperature (Tm) of 250° C. or higher, wherein the amount of the graft copolymer (A-1) is less than that of the graft copolymer (A-2), and preparing pellets at 220 to 280° C. using an extrusion kneader. In this case, the present invention has an effect of providing a thermoplastic resin composition having excellent weather resistance and low gloss while maintaining mechanical properties and processability equal or superior to those of conventional ASA-based resins. In addition, due to uniform surface gloss, the surface appearance of a co-extruded product may be improved.

More preferably, the method of preparing the thermoplastic resin composition of the present invention includes a step of mixing 34 to 36% by weight in total of an acrylate-aromatic vinyl compound-vinyl cyanide compound graft copolymer (A-1) containing acrylate rubber having a DLS average particle diameter of 0.05 to 0.2 μm or a TEM average particle diameter of 0.04 to 0.14 μm and an acrylate-aromatic vinyl compound-vinyl cyanide compound graft copolymer (A-2) containing acrylate rubber having a DLS average particle diameter of 0.33 to 0.5 μm or a TEM average particle diameter of 0.28 to 0.45 μm; greater than 0 and less than or equal to 30% by weight of an aromatic vinyl compound-vinyl cyanide compound copolymer (B-1) having a weight average molecular weight of 100,000 to 160,000 g/mol; 58 to 60% by weight of an aromatic vinyl compound-vinyl cyanide compound copolymer (B-2) having a weight average molecular weight of greater than 160,000 and less than or equal to 200,000 g/mol; and 4 to 8% by weight of a polyamide resin (C) having a melting temperature (Tm) of 250° C. or higher, wherein the amount of the graft copolymer (A-1) is less than that of the graft copolymer (A-2), the acrylate-aromatic vinyl compound-vinyl cyanide compound graft copolymer (A-1) includes 40 to 60% by weight of acrylate rubber having a DLS average particle diameter of 0.05 to 0.2 μm or a TEM average particle diameter of 0.04 to 0.14 μm, 25 to 45% by weight of an aromatic vinyl compound, and 10 to 20% by weight of a vinyl cyanide compound, the acrylate-aromatic vinyl compound-vinyl cyanide compound graft copolymer (A-2) includes 40 to 60% by weight of acrylate rubber having a DLS average particle diameter of 0.33 to 0.5 μm or a TEM average particle diameter of 0.28 to 0.45 μm, 25 to 45% by weight of an aromatic vinyl compound, and 10 to 20% by weight of a vinyl cyanide compound, the aromatic vinyl compound-vinyl cyanide compound copolymer (B-1) includes 65 to 80% by weight of an aromatic vinyl compound and 20 to 35% by weight of a vinyl cyanide compound, and the aromatic vinyl compound-vinyl cyanide compound copolymer (B-2) includes 65 to 80% by weight of an aromatic vinyl compound and 20 to 35% by weight of a vinyl cyanide compound, and preparing pellets at 220 to 280° C. using an extrusion kneader. In this case, the present invention has an effect of providing a thermoplastic resin composition having excellent weather resistance and low gloss while maintaining mechanical properties and processability equal or superior to those of conventional ASA-based resins. In addition, due to uniform surface gloss, the surface appearance of a co-extruded product may be improved.

The method of preparing the thermoplastic resin composition shares all the technical characteristics of the above-described thermoplastic resin composition. Accordingly, repeated description thereof will be omitted.

The step of preparing pellets using an extrusion kneader is preferably performed at 220 to 290° C., more preferably 250 to 290° C., still more preferably 270 to 290° C. In this case, the temperature is the temperature of a cylinder.

Extrusion kneaders commonly used in the art to which the present invention pertains may be used without particular limitation, and a twin-screw extrusion kneader is preferably used.

<Exterior Material>

An exterior material of the present invention includes the thermoplastic resin composition of the present invention. In this case, the exterior material has excellent appearance due to uniform and low gloss and improvement in viscoelasticity while having mechanical properties and processability equal or superior to those of conventional ASA resins.

For example, the exterior material may be a co-extrusion-molded article or an injection-molded article, preferably a siding material, a decking material, or a roofing material.

The exterior material is preferably prepared by extruding, coextruding, or injecting the thermoplastic resin composition of the present invention at a molding temperature of 190 to 250° C., preferably 190 to 230° C., more preferably 190 to 220° C. Within this range, a matte effect may be imparted to a product.

In the description of the thermoplastic resin composition of the present invention, the method of preparing the same, and the exterior material including the same, other conditions or equipment that are not explicitly described may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 8 and Comparative Examples 1 to 3 are as follows.
- A-1) First graft copolymer prepared by emulsion polymerization (core: 50% by weight of a butylacrylate polymer having an average particle diameter of 100 nm, shell: 36% by weight of styrene, 14% by weight of acrylonitrile)
- A-2) Second graft copolymer prepared by emulsion polymerization (core: 50% by weight of a butylacrylate polymer having an average particle diameter of 400 nm, shell: 37% by weight of styrene, 13% by weight of acrylonitrile)
- B-1) SAN resin (90HR, styrene: 73% by weight, acrylonitrile: 27% by weight) having a weight average molecular weight of 100,000 to 160,000 g/mol prepared by bulk polymerization
- B-2) SAN resin (97HC, styrene: 70% by weight, acrylonitrile: 30% by weight) having a weight average molecular weight of greater than 160,000 and less than or equal to 200,000 g/mol prepared by bulk polymerization
- B-3) SAN resin (200UH, alpha-methylstyrene: 71% by weight, acrylonitrile: 29% by weight) having a weight average molecular weight of 80,000 to 100,000 g/mol prepared by bulk polymerization
- D) Acrylic copolymer: SAMMA resin (XT510) prepared by bulk polymerization
- C) PA 6.6 having a melting temperature (Tm) of 261° C.

Examples 1 to 8 and Comparative Examples 1 to 3

According to the components and contents shown in Table 1 below, pellets were prepared at 280° C. using a 28 pi, L/D 36 standard extrusion kneader (twin-screw extruder).

Melt index was measured using the prepared pellets.

In addition, a film with a uniform thickness of 0.15 T was prepared from the pellets using a film extruder, and the film gloss of the prepared film was measured according to the following measurement method. At this time, a single-screw extruder for sheet molding (model: E20T, 20 pi, L/D:25, Collin Co.) was used as the film extruder, and temperature conditions were set as follows: barrel temperatures of 50, 200, 210, and 210° C. and die temperatures of 220, 220, and 230° C. in order from the inlet of the extruder. Prior to loading into the film extruder, the pellets were sufficiently dried in an oven at 80° C. for 3 hours or more to eliminate the effect of moisture. Then, the dried pellets were fed into the film extruder through the inlet of the film extruder to prepare a film with a uniform thickness of 0.15 T. The temperature of a rear roller was set to 85° C. using water as a medium, and the roller was configured such that only one side of a resin extruded through a T-die was in contact with a roll. At this time, the screw RPM of the film extruder was fixed to 100, and the linear velocity of the roll was adjusted so that a sheet had a thickness of 0.15 T. At this time, the film gloss of a surface in contact with the first roll among extruded sheet surfaces was measured. For reference, when measuring with a surface not in contact with the first roll, a difference may occur in surface roughness.

In addition, the prepared pellets were injected at a molding temperature of 220° C. to prepare a specimen for measuring physical properties, and the tensile strength and impact strength of the specimen were measured.

Test Examples

The properties of pellets, sheets, and specimens prepared in Examples 1 to 8 and Comparative Examples 1 to 3 were measured according to the following methods, and the results are shown in Table 1 below.

Melt index (MI): Melt index was measured using the prepared pellets under conditions of 220° C./10 kg according to ASTM D1238.

Tensile strength ($kg/cm^2$): Tensile strength was measured according to ASTM D638.

Izod impact strength (kg·cm/cm): Izod impact strength was measured according to ASTM D256.

Film gloss: Film gloss was measured at 60° using a gloss meter VG7000, and 220 gloss items are shown in Table 1 below.

At this time, a single-screw extruder for sheet molding (model: E20T, 20 pi, L/D:25, Collin Co.) was used as the film extruder. For 190° C. processing, temperature conditions were set as follows: barrel temperatures of 50, 190, 190, and 190° C. and die temperatures of 200, 200, and 200° C. in order from the inlet of the extruder. For 220° C. processing, temperature conditions were set as follows: barrel temperatures of 50, 200, 210, and 210° C. and die temperatures of 220, 220, and 230° C. in order from the inlet of the extruder. Prior to loading into the film extruder, the pellets were sufficiently dried in an oven at 80° C. for 3 hours or more to eliminate the effect of moisture. Then, the dried pellets were fed into the film extruder through the inlet of the film extruder to prepare a film with a uniform thickness of 0.15 T. The temperature of a rear roller was set to 85° C. using water as a medium, and the roller was configured such that only one side of a resin extruded through a T-die was in contact with a roll. At this time, the screw RPM of the film extruder was fixed at 100, and the linear velocity of the roll was adjusted so that a sheet had a thickness of 0.15 T. Film gloss was measured at 60° using a gloss meter VG7000, and 190 gloss items are shown in Table 1 below.

Heat deflection temperature (° C.): Heat deflection temperature was measured under a load of 18.5 kg/cm$^2$ using an HDT tester 6M-2 (Toyoseiki Co.) according to ASTM D648.

Melt shear viscosity (unit: Pa·s): Pellets were dried in an oven set to 80° C. for 2 hours or more. Then, the pellets were melt at a measurement barrel temperature of 190° C. in a single type barrel (diameter: 20 mm, depth: 20 cm) using a capillary rheometer (product name: RHEO-GRAPH 75 (RG75)), and then melt shear viscosity was measured while pushing the melted pellets at a shear rate of 10 to 2,000 (1/sec) using a capillary tube having a diameter of 1 mm. At this time, a reference value was 310 Pa·s or less at a shear rate of 2,000 (1/sec).

Storage modulus (G', unit: Pa): A viscoelasticity experiment was performed using pellets and using a viscoelasticity measurement device (ARES, G2) under conditions of amount per measurement: 10 g, a measurement geometry (a parallel plate having a diameter of 25 mm, a sample was loaded at 220° C. so that a gap was pressed to 1 mm, the gap was lowered, and then measurement was performed at 190° C.), frequency: 0.1 to 500 (rad/s), strain: 0.1%, measurement temperature: 190° C., and temperature increasing rate: 5° C./min. At this time, a reference value was 170,000 Pa or more at a frequency of 40 (rad/s).

TABLE 1

| (Parts by weight) | Example 1 | Example 2 | Example 3 | Example 4 | Example 5 | Example 6 |
|---|---|---|---|---|---|---|
| A-1 | 13 | 13 | 15 | 18 | 18 | 14 |
| A-2 | 23 | 23 | 19 | 20 | 20 | 24 |
| B-1 | — | 20 | 20 | 19 | 15 | 20 |
| B-2 | 58 | 38 | 40 | 37 | 41 | 36 |
| B-3 | — | — | — | — | — | — |
| D | — | — | — | — | — | — |
| C | 6 | 6 | 6 | 6 | 6 | 6 |
| TiO$_2$ pigment | 0.6 | 0.6 | 0.5 | 0.5 | 0.6 | 0.6 |
| Melt index | 5.0 | 7.0 | 7.4 | 6.2 | 5.5 | 5.7 |
| Tensile strength | 486 | 488 | 507 | 469 | 469 | 461 |
| Impact strength | 8.00 | 6.60 | 6.00 | 7.72 | 8.25 | 8.55 |
| 220 gloss | 4.0 | 4.7 | 5.0 | 5.5 | 5.2 | 4.6 |
| 190 gloss | 7.7 | 7.8 | 8.1 | 8.8 | 8.4 | 7.8 |
| HDT | 84.1 | 84.2 | 84.5 | 84.2 | 84.2 | 85.1 |
| Melt shear viscosity | 297 | 287 | 282 | 281 | 285 | 293 |
| Storage modulus | 195,299 | 176,472 | 170,631 | 175,997 | 178,753 | 180,644 |

| (Parts by weight) | Example 7 | Example 8 | Comparative Example 1 | Comparative Example 2 | Comparative Example 3 |
|---|---|---|---|---|---|
| A-1 | 10 | 17 | 25 | 13 | 20 |
| A-2 | 26 | 19 | 15 | 25 | 25 |
| B-1 | 20 | 20 | — | 41 | — |
| B-2 | 38 | 38 | — | — | — |
| B-3 | — | — | 54 | 15 | 10 |
| D | — | — | — | — | 42 |
| C | 6 | 6 | 6 | 6 | 6 |
| TiO$_2$ pigment | 0.5 | 0.6 | 0.6 | 0.6 | 0.5 |
| Melt index | 6.3 | 7.3 | 4.4 | 7.8 | 11.0 |
| Tensile strength | 466 | 486 | 460 | 440 | 392 |
| Impact strength | 9.54 | 7.24 | 7.50 | 6.70 | 6.80 |
| 220 gloss | 3.8 | 5.1 | 4.9 | 4.3 | 11.3 |
| 190 gloss | 7.5 | 8.1 | 7.5 | 6.5 | 14.0 |

TABLE 1-continued

| | | | | | |
|---|---|---|---|---|---|
| HDT | 83.6 | 85.3 | 94.0 | 86.0 | 75.0 |
| Melt shear viscosity | 268 | 277 | 420 | 347 | 286 |
| Storage modulus | 178,961 | 177,087 | 209,217 | 179,673 | 140,843 |

As shown in Table 1, it can be confirmed that the thermoplastic resin compositions (see Examples 1 to 8) according to the present invention maintain mechanical properties, such as melt index, tensile strength, and impact strength, and surface gloss equal or superior to those of Comparative Examples 1 to 3 having a configuration partially different from the configuration of the present invention. In addition, in the case of the thermoplastic resin compositions of the present invention, due to improvement in viscoelasticity, the surface appearance of a co-extruded product is improved and luxuriousness is increased.

In addition, although not described in the above experimental examples, when the small-diameter graft copolymer was not included in a smaller amount than the large-diameter graft copolymer, storage modulus was not improved, and appropriate impact strength and low gloss were not exhibited at the same time.

Summarizing these results, the present invention provides a resin composition including a styrene-based resin and a polyamide-based resin and satisfying viscous and elastic properties. Due to these compositional characteristics and physical properties, the resin composition according to the present invention has excellent aesthetics, such as softness, luxuriousness, and naturalness due to improvement in surface texture while maintaining mechanical properties and processability equal or superior to those of conventional ASA-based resins. In addition, due to improvement in viscoelastic properties, the resin composition of the present invention has excellent processability and adhesion in manufacture of a co-extruded product. Accordingly, when the resin composition of the present invention is used, defects in surface appearance may be significantly reduced, and excellent exterior materials may be manufactured.

The invention claimed is:

1. A thermoplastic resin composition, comprising:
   10 to 50% by weight in total of an acrylate-aromatic vinyl compound-vinyl cyanide compound graft copolymer (A-1) containing acrylate rubber having a DLS average particle diameter of 0.05 to 0.2 μm or a TEM average particle diameter of 0.04 to 0.14 μm and an acrylate-aromatic vinyl compound-vinyl cyanide compound graft copolymer (A-2) containing acrylate rubber having a DLS average particle diameter of 0.33 to 0.5 μm or a TEM average particle diameter of 0.28 to 0.45 μm, wherein an amount of the graft copolymer (A-1) is less than that of the graft copolymer (A-2);
   0 to 30% by weight of an aromatic vinyl compound-vinyl cyanide compound copolymer (B-1) having a weight average molecular weight of 100,000 to 160,000 g/mol;
   20 to 70% by weight of an aromatic vinyl compound-vinyl cyanide compound copolymer (B-2) having a weight average molecular weight of greater than 160,000 and less than or equal to 200,000 g/mol; and
   0.5 to 10% by weight of a polyamide resin (C) having a melting temperature (Tm) of 250° C. or higher.

2. The thermoplastic resin composition according to claim 1, wherein the thermoplastic resin composition has a melt shear viscosity of 310 Pa·s or less at a shear rate of $2,000^{-1}$ as measured at a measurement temperature of 190° C. using a capillary viscometer.

3. The thermoplastic resin composition according to claim 1, wherein the thermoplastic resin composition has a storage modulus (G') of 170,000 Pa or more at a frequency of 40 rad/s as measured at a measurement temperature of 190° C., a strain of 0.1% using a rotary rheometer.

4. The thermoplastic resin composition according to claim 1, wherein, based on a total weight of the graft copolymers (A-1) and (A-2), the graft copolymer (A-1) is present in an amount of 10 to 50% by weight and the graft copolymer (A-2) is present in an amount of 50 to 90% by weight.

5. The thermoplastic resin composition according to claim 1, wherein the graft copolymer (A-1) comprises 40 to 60% by weight of the acrylate rubber having the DLS average particle diameter of 0.05 to 0.2 μm or the TEM average particle diameter of 0.04 to 0.14 μm, 25 to 45% by weight of a first aromatic vinyl compound, and 10 to 20% by weight of a first vinyl cyanide compound;
   the graft copolymer (A-2) comprises 40 to 60% by weight of the acrylate rubber having the DLS average particle diameter of 0.33 to 0.5 μm or the TEM average particle diameter of 0.28 to 0.45 μm, 25 to 45% by weight of a second aromatic vinyl compound, and 10 to 20% by weight of a second vinyl cyanide compound;
   the copolymer (B-1) comprises 65 to 80% by weight of a third aromatic vinyl compound and 20 to 35% by weight of a third vinyl cyanide compound; and
   the copolymer (B-2) comprises 65 to 80% by weight of a fourth aromatic vinyl compound and 20 to 35% by weight of a fourth vinyl cyanide compound.

6. The thermoplastic resin composition according to claim 1, wherein, based on a total weight of the thermoplastic resin composition, the graft copolymer (A-1) is present in an amount of 9 to 35% by weight, and the graft copolymer (A-2) is present in amount of 16 to 41% by weight.

7. The thermoplastic resin composition according to claim 1, further comprising 0.1 to 5 parts by weight of an inorganic pigment based on 100 parts by weight in total of the graft copolymer (A-1), the graft copolymer (A-2), the copolymer (B-1), the copolymer (B-2), and the polyamide resin (C).

8. The thermoplastic resin composition according to claim 1, wherein the thermoplastic resin composition has a heat deflection temperature of 83° C. or higher as measured under a load of 18.5 kg/cm$^2$ according to ASTM D648.

9. The thermoplastic resin composition according to claim 1, wherein, based on a total weight of the thermoplastic resin composition, the copolymer (B-1) is present in an amount of 10 to 30% by weight, and the copolymer (B-2) is present in an amount of 30 to 60% by weight.

10. A thermoplastic resin composition, comprising:
    34 to 36% by weight in total of:
       an acrylate-aromatic vinyl compound-vinyl cyanide compound graft copolymer (A-1) containing:
          40 to 60% by weight of acrylate rubber having a DLS average particle diameter of 0.05 to 0.2 μm or a TEM average particle diameter of 0.04 to 0.14 μm, 25 to 45% by weight of a first aromatic vinyl compound, and
10 to 20% by weight of a first vinyl cyanide compound; and an acrylate-aromatic vinyl compound-vinyl cyanide compound graft copolymer (A-2) containing:
40 to 60% by weight of acrylate rubber having a DLS average particle diameter of 0.33 to 0.5 μm or a TEM average particle diameter of 0.28 to 0.45 μm,
25 to 45% by weight of a second aromatic vinyl compound, and
10 to 20% by weight of a second vinyl cyanide compound, wherein an amount of the graft copolymer (A-1) is less than that of the graft copolymer (A-2);

0 to 20% by weight of an aromatic vinyl compound-vinyl cyanide compound copolymer (B-1) having a weight average molecular weight of 100,000 to 160,000 g/mol and comprising 65 to 80% by weight of a third aromatic vinyl compound and 20 to 35% by weight of a third vinyl cyanide compound;

38 to 58% by weight of an aromatic vinyl compound-vinyl cyanide compound copolymer (B-2) having a weight average molecular weight of greater than 160,000 and less than or equal to 200,000 g/mol and comprising 65 to 80% by weight of a fourth aromatic vinyl compound and 20 to 35% by weight of a fourth vinyl cyanide compound; and 4 to 8% by weight of a polyamide resin (C) having a melting temperature (Tm) of 250° C. or higher.

11. An exterior material, comprising the thermoplastic resin composition according to claim 1.

12. The exterior material according to claim 11, wherein the exterior material is a siding material, a roofing material, or a decking material.

* * * * *